(12) United States Patent
Webber et al.

(10) Patent No.: US 10,281,086 B2
(45) Date of Patent: May 7, 2019

(54) ANTI-AGGLOMERANTS FOR CONTROLLING GAS HYDRATES

(71) Applicant: Ecolab USA Inc., St. Paul, MN (US)

(72) Inventors: Peter A. Webber, Sugar Land, TX (US); Sahana Nagappayya, Houston, TX (US)

(73) Assignee: Ecolab USA Inc., St. Paul, MN (US)

( * ) Notice: Subject to any disclaimer, the term of this patent is extended or adjusted under 35 U.S.C. 154(b) by 110 days.

(21) Appl. No.: 15/231,424

(22) Filed: Aug. 8, 2016

(65) Prior Publication Data

US 2016/0348848 A1    Dec. 1, 2016

Related U.S. Application Data

(63) Continuation of application No. 14/090,621, filed on Nov. 26, 2013, now Pat. No. 9,410,073.

(51) Int. Cl.
*C09K 8/52* (2006.01)
*F17D 1/16* (2006.01)
*C10G 75/04* (2006.01)

(52) U.S. Cl.
CPC .................. *F17D 1/16* (2013.01); *C09K 8/52* (2013.01); *C10G 75/04* (2013.01); *C09K 2208/22* (2013.01)

(58) Field of Classification Search
CPC .... C09K 2208/22; C09K 8/52; Y10S 507/929
USPC ......................................................... 507/90
See application file for complete search history.

(56) References Cited

U.S. PATENT DOCUMENTS

| | | |
|---|---|---|
| 3,773,896 A * | 11/1973 | Preusser .............. B01D 53/526 |
| | | 423/226 |
| 5,744,665 A | 4/1998 | Costello et al. |
| 6,281,172 B1 | 8/2001 | Warren et al. |
| 6,596,911 B2 | 7/2003 | Przybylinski et al. |
| 7,264,653 B2 | 9/2007 | Panchalingam et al. |
| 7,381,689 B2 | 6/2008 | Panchalingam et al. |
| 8,329,620 B2 | 12/2012 | Acosta |
| 8,334,240 B2 | 12/2012 | Acosta |
| 2007/0129256 A1 | 6/2007 | Dahlmann et al. |
| 2009/0114879 A1 | 5/2009 | Hellsten et al. |
| 2010/0087339 A1 | 4/2010 | Acosta |
| 2010/0222239 A1* | 9/2010 | Acosta ................. C07D 241/04 |
| | | 507/90 |
| 2011/0319682 A1 | 12/2011 | Kang |
| 2012/0157351 A1 | 6/2012 | Webber |
| 2012/0161070 A1 | 6/2012 | Webber et al. |
| 2013/0261032 A1 | 10/2013 | Ladva et al. |
| 2014/0190692 A1* | 7/2014 | Hibbeler ............... E21B 21/062 |
| | | 166/279 |

FOREIGN PATENT DOCUMENTS

| | | |
|---|---|---|
| WO | 2013/048365 A1 | 4/2013 |
| WO | 2013/089802 A1 | 6/2013 |

OTHER PUBLICATIONS

International Search Report and Written Opinion issued for PCT/US2014/059730 dated Jan. 21, 2015, 15 pages.

* cited by examiner

*Primary Examiner* — Aiqun Li
(74) *Attorney, Agent, or Firm* — Stinson Leonard Street LLP

(57) ABSTRACT

The present invention generally relates to one or more compositions and methods for inhibiting the formation of gas hydrate agglomerates in a fluid. The fluid may be contained, for example, in an oil or gas pipeline or refinery.

17 Claims, No Drawings

ANTI-AGGLOMERANTS FOR CONTROLLING GAS HYDRATES

CROSS-REFERENCE TO RELATED APPLICATION

This application is a continuation patent application of U.S. patent application Ser. No. 14/090,621 filed on Nov. 26, 2013, the disclosure of which is incorporated herein by reference in its entirety.

FIELD OF THE INVENTION

The present invention generally relates to one or more compositions and methods for inhibiting the formation of gas hydrate agglomerates in a fluid. The fluid may be contained, for example, in an oil or gas pipeline or refinery.

BACKGROUND OF THE INVENTION

Natural gas hydrates are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure. In 1934, Hammerschmidt determined that natural gas hydrates were blocking gas transmission lines, frequently at temperatures above the ice point. This discovery caused a more pragmatic interest in gas hydrates and led to the regulation of the water content in natural gas pipelines.

Gas hydrates can be easily formed during the transportation of oil and gas in pipelines under certain conditions. Factors affecting gas hydrate formation include gas composition, water content, temperature and pressure, particularly low temperature and high pressure. While these crystalline cage-like structures are small initially, they are able to agglomerate into solid masses called gas hydrate plugs. The formation of gas hydrates within a pipeline often results in lost oil or gas production, damage to transmission lines and equipment, and safety hazards to field workers.

Three types of hydrate inhibitors are currently available to the energy industry for controlling gas hydrates: thermodynamic hydrate inhibitors (THIs), kinetic hydrate inhibitors (KHIs), and anti-agglomerants (AAs). Thermodynamic inhibitors are substances that can reduce the temperature at which gas hydrates form at a given pressure and water content. Methanol and ethylene glycol are among the most common thermodynamic inhibitors used in the oil industry. However, thermodynamic inhibitors often have to be added in large amounts to be effective, typically in the order of several tens of percent by weight of the water present. Therefore, there is a substantial cost associated with transportation and storage of large quantities of THIs.

A more cost-effective alternative is the use of kinetic hydrate inhibitors and anti-agglomerants, which are known collectively as low-dosage hydrate inhibitors (LDHIs), reflecting the much lower dosage requirements compared with THIs. Typically, KHIs are low molecular weight polymers that adsorb on gas hydrate crystal faces and interfere with the nucleation and growth of gas hydrate crystals. Unfortunately, there are several limitations that have been discovered with the use of KHIs such as subcooling limits, solubility problems based on temperature and salt content of the water, chemical incompatibility with the system being treated, and expense of the polymers used.

Anti-agglomerants are an alternative to THIs and KHIs. Anti-agglomerants are surface active molecules that attach to and disperse fine gas hydrate crystals, preventing their agglomeration and growth into masses that could become plugs. When small gas hydrate crystals begin to form, AAs attach to them to make the surface hydrophobic, which mediates the capillary attraction between the crystals and water and disperses the crystals into the hydrocarbon phase. This results in a transportable slurry that can flow to the processing facility.

AAs are a cost effective alternative to THIs and are not generally sensitive to changes in system subcooling like KHIs. However, since AAs require a hydrocarbon phase to disperse the gas hydrate crystals, they typically have a water-cut limitation. In general, the water-cut should be below 50% because otherwise the slurry becomes too viscous to transport.

Accordingly, there is an ongoing need for compositions and methods that effectively prevent agglomeration of gas hydrates in oil and gas transportation and handling processes, particularly at water-cuts greater than 50%.

SUMMARY OF THE INVENTION

One aspect of the invention is a method for inhibiting gas hydrate agglomeration in a fluid comprising a hydrocarbon and water. The method comprises adding to the fluid an effective amount of a compound of formula 1A or a compound of formula 1B to inhibit gas hydrate agglomeration in the fluid. The compound having the formula:

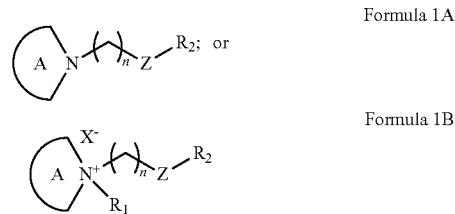

wherein A is an optionally substituted pyrrole, pyrroline, pyrrolidine, piperidine, pyrazole, pyrazoline, pyrazolidine, imidazole, imidazoline, imidazolidine, triazole, isoxazole, isoxazoline, isoxazolidine, oxazole, oxazoline, thiazole, isothiazole, oxadiazole, oxatriazole, dioxazole, oxathiazole, pyridine, pyridazine, pyrimidine, pyrazine, triazine, oxazine, oxathiazine, oxazine, isoxazine, oxadiazine, morpholine, azepane, azepine, caprolactam, or quinoline; $R_1$ is hydrogen, optionally substituted alkyl, alkenyl, alkynyl, or aryl; $R_2$ is hydrogen, optionally substituted alkyl, alkenyl, or alkynyl; Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, —$NR_3$—C(O)—$NR_3$—, or absent; $R_3$ is hydrogen, optionally substituted alkyl, alkenyl, alkynyl, or aryl; n is an integer from 0 to 25; and $X^-$ is an anion.

Another aspect of the invention is a method for inhibiting gas hydrate agglomeration in a fluid comprising a hydrocarbon and water. The method comprises adding to the fluid an effective amount of a compound of formula 1A or a compound of formula 1B to inhibit gas hydrate agglomeration in the fluid, the compound having the formula:

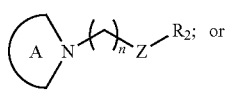

Formula 1A

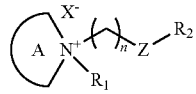

Formula 1B wherein A is an optionally substituted nitrogen-containing heterocycle; $R_1$ is hydrogen, optionally substituted alkyl, alkenyl, alkynyl, or aryl; $R_2$ is hydrogen, optionally substituted alkyl, alkenyl, or alkynyl; Z is —$NR_3$—C(O)—, —O—C(O)—, —S—C(O)—, —C(O)—S—, —O—C(O)—$NR_3$—, —$NR_3$—C(O)—O—, —$NR_3$—C(O)—$NR_3$—, or absent; $R_3$ is hydrogen, optionally substituted alkyl, alkenyl, alkynyl, or aryl; n is an integer from 0 to 25; $X^-$ is an anion; and when A is oxazolidine and $R_2$ is alkyl, Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, or —$NR_3$—C(O)—$NR_3$—.

Yet another aspect of the invention is an anti-agglomeration composition for inhibiting gas hydrate formation in a hydrocarbon fluid. The composition comprises about 1-80 wt. % of an anti-agglomerate compound; a solvent; and at least one of a corrosion inhibitor, a scale inhibitor, a paraffin inhibitor, an asphaltene inhibitor, an emulsion breaker, a water clarifier, or a combination thereof; wherein the anti-agglomerant compound is present in an amount which, upon addition to a hydrocarbon fluid at a well head, a riser or a flow line of a sub-sea oil system, will prevent gas hydrate agglomeration, the compound having a structure of formula 1A or a compound of formula 1B:

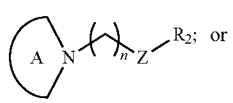

Formula 1A

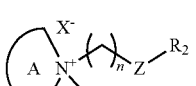

Formula 1B wherein A is an optionally substituted pyrrole, pyrroline, pyrrolidine, piperidine, pyrazole, pyrazoline, pyrazolidine, imidazole, imidazoline, imidazolidine, triazole, isoxazole, isoxazoline, isoxazolidine, oxazole, oxazoline, oxazolidine, thiazole, isothiazole, oxadiazole, oxatriazole, dioxazole, oxathiazole, pyridine, pyridazine, pyrimidine, pyrazine, triazine, oxazine, oxathiazine, oxazine, isoxazine, oxadiazine, morpholine, azepane, azepine, caprolactam, or quinoline; $R_1$ is hydrogen, optionally substituted alkyl, alkenyl, alkynyl, or aryl; $R_2$ is hydrogen, optionally substituted alkyl, alkenyl, or alkynyl; Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, —$NR_3$—C(O)—$NR_3$—, or absent; $R_3$ is hydrogen, optionally substituted alkyl, alkenyl, alkynyl, or aryl; n is an integer from 0 to 25; $X^-$ is an anion; and when A is oxazolidine and $R_2$ is alkyl, Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, or —$NR_3$—C(O)—$NR_3$—; or the compound having the formula:

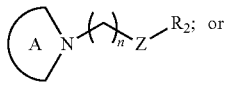

Formula 1A

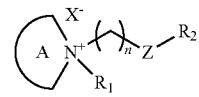

Formula 1B wherein A is an optionally substituted nitrogen-containing heterocycle; $R_1$ is hydrogen, optionally substituted alkyl, alkenyl, alkynyl, or aryl; $R_2$ is hydrogen, optionally substituted alkyl, alkenyl, or alkynyl; Z is —$NR_3$—C(O)—, —O—C(O)—, —S—C(O)—, —C(O)—S—, —O—C(O)—$NR_3$—, —$NR_3$—C(O)—O—, —$NR_3$—C(O)—$NR_3$—, or absent; $R_3$ is hydrogen, optionally substituted alkyl, alkenyl, alkynyl, or aryl; n is an integer from 0 to 25; $X^-$ is an anion; and when A is oxazolidine and $R_2$ is alkyl, Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, or —$NR_3$—C(O)—$NR_3$—.

Other objects and features will be in part apparent and in part pointed out hereinafter.

DETAILED DESCRIPTION OF THE INVENTION

Compositions and methods for inhibiting gas hydrate agglomeration are provided to effectively control gas hydrate formation and plugging in hydrocarbon production and transportation systems. The methods may be applied to prevent, reduce or mitigate plugging of conduits, pipes, transfer lines, valves, and other places or equipment where hydrate agglomerates may form.

The AAs useful in the compositions and methods contain an effective amount of a compound of formula 1A or a compound of formula 1B to inhibit gas hydrate agglomeration in the fluid, the compound having the formula:

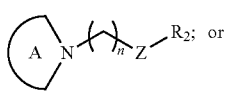

Formula 1A

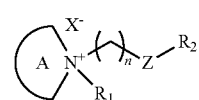

Formula 1B wherein A is an optionally substituted pyrrole, pyrrolidine, piperidine, pyrazole, imidazole, triazole, isoxazole, oxazole, thiazole, isothiazole, oxadiazole, oxatriazole, dioxazole, oxathiazole, pyridine, pyridazine, pyrimidine, pyrazine, triazine, oxazine, oxathiazine, oxazine, isoxazine, oxadiazine, morpholine, azepane, azepine, caprolactam, or quinoline; $R_1$ is hydrogen, optionally substituted alkyl, optionally substituted alkenyl, optionally substituted alkynyl, or optionally substituted aryl; $R_2$ is hydrogen, optionally substituted alkyl, alkenyl, or alkynyl; Z is —NR₃—C(O)—, —C(O)—NR₃—, —O—C(O)—, —C(O)—O—, —S—C(O)—, —C(O)—S—, —O—C(O)—NR₃—, —NR₃—C(O)—O—, —NR₃—C(O)—NR₃—, or absent; R₃ is hydrogen, optionally substituted alkyl, optionally substituted alkenyl, optionally substituted alkynyl, or optionally substituted aryl; n is an integer from 0 to 25; X⁻ is an anion; and when A is oxazolidine and R₂ is alkyl, Z is —NR₃—C(O)—, —C(O)—NR₃—, —O—C(O)—, —C(O)—O—, —S—C(O)—, —C(O)—S—, —O—C(O)—NR₃—, —NR₃—C(O)—O—, or —NR₃—C(O)—NR₃—.

The compound of Formula 1A or 1B can also have A as an optionally substituted nitrogen-containing heterocycle; R₁ as hydrogen, optionally substituted alkyl, optionally substituted alkenyl, optionally substituted alkynyl, or optionally substituted aryl; R₂ as hydrogen, optionally substituted alkyl, alkenyl, or alkynyl; Z as —NR₃—C(O)—, —O—C(O)—, —S—C(O)—, —C(O)—S—, —O—C(O)—NR₃—, —NR₃—C(O)—O—, —NR₃—C(O)—NR₃—, or absent; R₃ as hydrogen, optionally substituted alkyl, optionally substituted alkenyl, optionally substituted alkynyl, or optionally substituted aryl; n as an integer from 0 to 25; X⁻ as an anion; and when A is oxazolidine, Z as —NR₃—C(O)—, —C(O)—NR₃—, —O—C(O)—, —C(O)—O—, —S—C(O)—, —C(O)—S—, —O—C(O)—NR₃—, —NR₃—C(O)—O—, or —NR₃—C(O)—NR₃—.

The optionally substituted nitrogen-containing heterocycle A of the compound of Formula 1A or 1B can be an optionally substituted pyrrole, pyrroline, pyrrolidine, piperidine, pyrazole, pyrazoline, pyrazolidine, imidazole, imidazoline, imidazolidine, triazole, isoxazole, isoxazoline, isoxazolidine, oxazole, oxazoline, oxazolidine, thiazole, isothiazole, oxadiazole, oxatriazole, dioxazole, oxathiazole, pyridine, pyridazine, pyrimidine, pyrazine, piperazine, triazine, oxazine, oxathiazine, oxazine, isoxazine, oxadiazine, morpholine, azepane, azepine, caprolactam, or quinoline.

Further, the optionally substituted nitrogen-containing heterocycle A of the compound of Formula 1A or 1B can be an optionally substituted five-membered nitrogen-containing heterocycle. For example, the five-membered nitrogen-containing heterocycle can be pyrrole, pyrroline, pyrrolidine, pyrazole, pyrazoline, pyrazolidine, imidazole, imidazoline, imidazolidine, isoxazole, isoxazoline, isoxazolidine, oxazole, oxazoline, or oxazolidine.

The compound of Formula 1A or 1B can have A as an optionally substituted pyrrole, pyrrolidine, piperidine, pyrazole, imidazole, pyridine, pyrimidine, piperazine, or morpholine.

The compound of Formulae 1A or 1B can comprise the compound of Formula 1B having the structure of Formula 2B, 5B, 6B, 7B, 8B, 9B, or 10B:

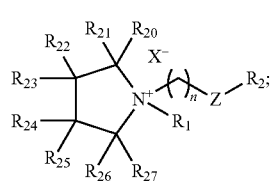

Formula 2B

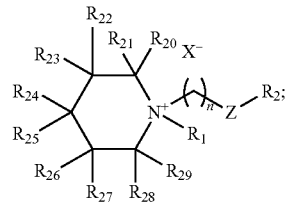

Formula 5B

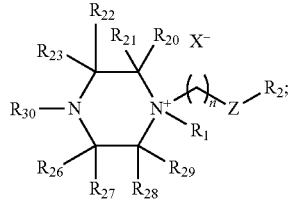

Formula 6B

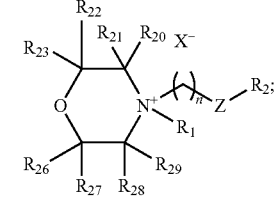

Formula 7B

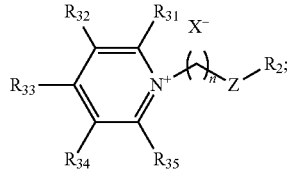

Formula 8B

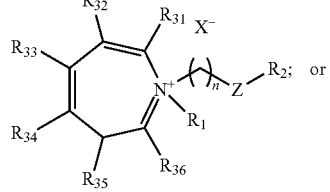

Formula 9B

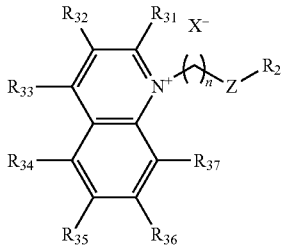

Formula 10B wherein n, Z, R₁, R₂, and X are as defined in connection with Formula 1B and R₂₀, R₂₁, R₂₂, R₂₃, R₂₄, R₂₅, R₂₆, R₂₇, R₂₈, and R₂₉ are each independently hydrogen, alkyl, alkoxy, aminoalkyl, carboxyl, carboxyalkyl, alkenyl, alkenoxy; carboxyalkenyl, aryl, aryloxy, or carboxyaryl; R₃₀ is hydrogen, alkyl, or aryl; and R₃₁, R₃₂, R₃₃, R₃₄, R₃₅, R₃₆, and R₃₇ are each independently hydrogen, alkyl, alkoxy, aminoalkyl, carboxyl, carboxyalkyl, alkenyl, alkenoxy; carboxyalkenyl, aryl, aryloxy, or carboxyaryl.

The compound of Formula 1B can also have the structure of Formula 2B, 5B, 7B, 8B, 9B, or 10B.

The anti-agglomerant compounds of Formula 1B as described above can have R₁ as hydrogen, alkyl, or aryl; R₂ as $C_{10}$-$C_{24}$ alkyl or alkenyl; Z as —$NR_3$—C(O)— or —C(O)—$NR_3$—; n as an integer from 0 to 12; and $X^-$ as an organic anion.

The compound of Formula 1B can have the structure of Formula 2B

Formula 2B

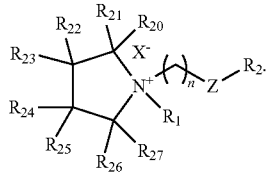

The compositions and methods can include a compound of Formula 2B wherein $R_{20}$, $R_{21}$, $R_{22}$, $R_{23}$, $R_{24}$, $R_{25}$, $R_{26}$, and $R_{27}$ are hydrogen. Alternatively, $R_{20}$, $R_{21}$, $R_{22}$, $R_{23}$, $R_{24}$, $R_{25}$, and $R_{26}$ are hydrogen and $R_{27}$ is carboxyl.

The compositions and methods can further include a compound of Formula 2B wherein $R_1$ is hydrogen, Z is —$NR_3$—C(O)— and $R_3$ is hydrogen.

The anti-agglomerant compound can have the structure of Formula 5B

Formula 5B

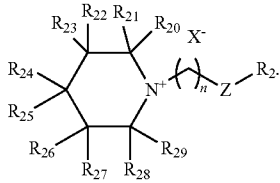

The compositions and methods can include a compound of Formula 5B wherein $R_{20}$, $R_{21}$, $R_{22}$, $R_{23}$, $R_{24}$, $R_{25}$, $R_{26}$, $R_{27}$, $R_{28}$, and $R_{29}$ are hydrogen, Z is —$NR_3$—C(O)— or —C(O)—$NR_3$—, $R_3$ is hydrogen, $R_2$ is $C_{10}$-$C_{20}$ alkyl or alkenyl, and n is 2 or 3.

The compound of Formula 1A or 1B can comprise the compound of Formula 1A having the structure of Formula 2A, 3A, 4A, 5A, 6A, 7A, 8A, 9A, or 11A:

Formula 2A

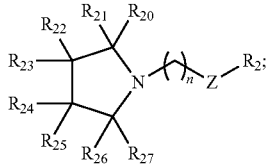

Formula 3A

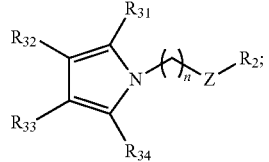

Formula 4A

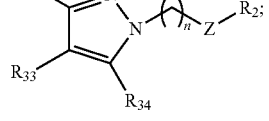

Formula 5A

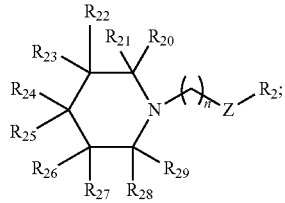

Formula 6A

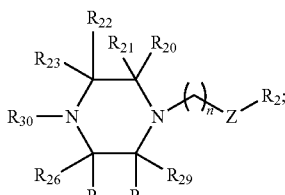

Formula 7A

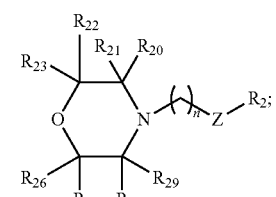

Formula 8A

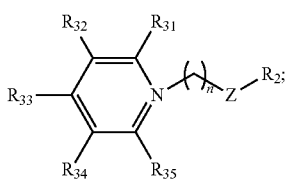

Formula 9A

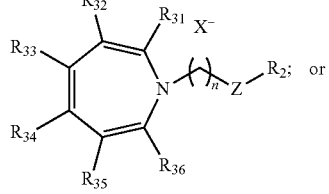

Formula 11A

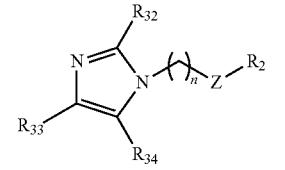

wherein n, Z, $R_1$, and $R_2$ are as defined in connection with Formula 1A and $R_{20}$, $R_{21}$, $R_{22}$, $R_{23}$, $R_{24}$, $R_{25}$, $R_{26}$, $R_{27}$, $R_{28}$, and $R_{29}$ are each independently hydrogen, alkyl, alkoxy, aminoalkyl, carboxyl, carboxyalkyl, alkenyl, alkenoxy; carboxyalkenyl, aryl, aryloxy, or carboxyaryl; $R_{30}$ is hydrogen, alkyl, or aryl; and $R_{31}$, $R_{32}$, $R_{33}$, $R_{34}$, $R_{35}$, and $R_{36}$ are each independently hydrogen, alkyl, alkoxy, aminoalkyl, carboxyl, carboxyalkyl, alkenyl, alkenoxy; carboxyalkenyl, aryl, aryloxy, or carboxyaryl.

The anti-agglomerant compound of Formula 1A can also have the structure of Formula 2A, 3A, 4A, 5A, 7A, 8A, 9A, or 11A.

The anti-agglomerant compounds of Formula 1A as described above can have $R_2$ as $C_{10}$-$C_{24}$ alkyl or alkenyl; Z as —$NR_3$—C(O)— or —C(O)—$NR_3$—; n as an integer from 0 to 12; and $X^-$ as an organic anion.

The compound of Formula 1A can have the structure of Formula 3A

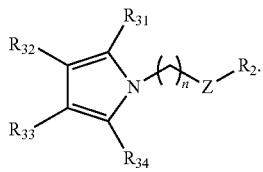

Formula 3A

The compositions and methods can include a compound of Formula 3A wherein $R_{31}$, $R_{32}$, $R_{33}$, and $R_{34}$ are hydrogen, Z is —$NR_3$—C(O)— or —C(O)—$NR_3$—, $R_3$ is hydrogen, $R_2$ is $C_{10}$-$C_{20}$ alkyl or alkenyl, and n is 2 or 3.

The compositions and methods can include a compound of Formula 1A, 2A, 2B, 3A, 4A, 5A, 5B, 6A, 7A, 7B, 8A, 8B, 9A, 9B, 10B, or 11A wherein Z is —C(O)—$NR_3$— and $R_3$ is hydrogen.

The compositions and methods can include a compound of Formula 1A, 2A, 2B, 3A, 4A, 5A, 5B, 6A, 6B, 7A, 7B, 8A, 8B, 9A, 9B, 10B, or 11A wherein $R_2$ is $C_{10}$-$C_{20}$ alkyl or alkenyl, and n is 2 or 3.

The compositions and methods can include a compound of Formula 1A, 2A, 2B, 3A, 4A, 5A, 5B, 6A, 6B, 7A, 7B, 8A, 8B, 9A, 9B, 10B, and 11A wherein the anion is a halide, a carbonate, or a carboxylate anion.

There are a number of factors that must be taken into account in determining the effective amount of an AA compound of Formula 1A or 1B, including, but not necessarily limited to, the proportion of water in the fluid, the nature of the hydrocarbon, the nature of the hydrate-forming guest molecules, the temperature and pressure conditions that the mixture of hydrocarbon and water are subject to, the particular compound employed, etc. Routine experimentation with a particular set of conditions and/or in a specific system can determine the optimum dosage range to avoid the formation of problematic quantities of irreversible, harmful gas hydrate masses.

The methods of the present invention involve contacting a hydrocarbon and water mixture with a suitable AA compound or composition containing an AA compound. When an effective amount of the AA compound is used, gas hydrate blockage is inhibited. In the absence of such an effective amount, gas hydrate blockage is not inhibited.

The contacting may be achieved in a number of ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition or AA compound into the mixture. The contacting can be made in-line and/or offline. The various components of the composition may be mixed prior to and/or during contact. If needed or desired, the composition or some of its components may be optionally removed or separated mechanically, chemically, or by other methods known to one skilled in the art, or by a combination of these methods after the gas hydrate formation conditions are no longer present.

When considering the appropriate dose or whether additional doses of AA compound are needed, the temperature, pressure, brine composition, brine volume, oil composition, oil volume, and gas composition are considered for a particular system to determine the effective amount of AA compound to inhibit gas hydrate agglomeration under the conditions present for the particular system to be treated.

The AA compound is added into the mixture of hydrocarbons and water at any concentration effective to inhibit the formation of gas hydrate agglomerates under the given conditions. Accordingly, the effective amount of the compound can range from about 0.1 volume percent to about 10 volume percent based on the amount of produced water in the well system. Preferably, the effective amount of the compound can range from about 0.1 volume percent to about 5 volume percent. The effective amount of the compound can also range from about 0.5 volume percent to about 5 volume percent. Typically, the amount of produced water is based on the amount of produced water per day that is calculated from the average volume of production per day for a particular well. The effective amount of the AA compound can be provided to the system in one or more doses.

The AA compound or composition (e.g., AA compound and solvent) can also have particular properties for advantageous use in a well, transport, or other system. For example, the composition can have a viscosity of less than 250 cP, preferably, less than 100 cP, to provide a composition that can be easily pumped throughout a system. The AA compound can preferably have a viscosity of less than 50 cP as a neat liquid.

The compositions and compounds are advantageously stable for at least 2 years at temperatures of 0° C. and 50° C. The compositions and compounds are stable when they do not stratify or gel upon storage under these conditions.

The compositions and AA compounds are chemically compatible with various elastomers and metals. Elastomers screened or compatibility can include Neoprene (i.e., polychloroprene), Hypalon® (chlorosulfonated polyethylene synthetic rubber), nitrile butadiene rubber (NBR), ethylene propylene rubber (EPR), Teflon® (polytetrafluoroethylene), Kalrez® (perfluoro hydrocarbon elastomer), high density polyethylene (HDPE), Nylon 11 (polyamide bioplastic), polyether ether keton (PEEK), ethylene propylene diene rubber (EPDM White), hydrogenated nitrile butadiene rubber (HNBR), Viton® A (perfluoro hydrocarbon elastomer), Viton® B (perfluoro hydrocarbon elastomer), and Chemraz® (perfluoro hydrocarbon elastomer). Metals screened for compatibility can include AISI 1018 carbon steel, Inconel® 625 nickel-chromium alloy, SS2507 stainless steel, copper, SS2205 stainless steel, Hastelloy C-276® (nickel-molybdenum-chromium alloy), SS304L stainless steel, and SS316L stainless steel. The elastomers and metals are screened for compatibility at the effective amount used in the system as described above. The compositions and compounds are chemically compatible with metals when they do not cause corrosion to occur to the stainless steel and mild carbon steel components of the system and are chemically compatible with elastomers when they do not cause mass change or swelling.

Also, the compositions and compounds preferably do not interfere or react with any corrosion inhibitor, scale inhibitor, or other production chemical additives that are used in the system.

Advantageously, the AA compositions and compounds do not form emulsions or foams when stored or upon use in a system. Emulsion formation can cause water quality issues in disposal of the produced water and foaming of the produced liquid can cause handling and system upset problems.

The AA compositions and compounds can also reduce friction or drag when fluids are transported. Thus, these compounds and compositions can act as drag reducers or friction reducers when added to the hydrocarbon fluids.

The methods are useful for inhibiting hydrate formation for many hydrocarbons and hydrocarbon mixtures. The methods are particularly useful for lighter or low-boiling, $C_1$-$C_5$ hydrocarbon gases or gas mixtures at ambient conditions. Non-limiting example of such gases include methane, ethane, propane, n-butane, isobutane, isopentane and mixtures thereof. Other examples include various natural gas mixtures that are present in many gas and/or oil formations and natural gas liquids. The hydrates of all these low-boiling hydrocarbons are also referred to as gas hydrates. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

The methods can be used at any pressure that allows formation of hydrocarbon gas hydrates. When the hydrocarbons in the mixture are lower boiling hydrocarbons or hydrocarbon gases at ambient conditions, the pressure is usually at or greater than atmospheric pressure (i.e. about 101 kPa), preferably greater than about 1 MPa, and more preferably greater than about 5 MPa. The pressure in certain formation or processing units or plants could be much higher, such as greater than about 20 MPa. There is no specific high-pressure limit.

The temperature for contacting the mixture with the compound or composition is usually approximately at or below ambient or room temperature. Lower temperatures tend to favor gas hydrate formation. At much higher temperatures, gas hydrates are less likely to form.

In addition to the AA compound of Formula 1A or 1B, the composition may also include liquids. These liquids are generally solvents for the solid form of the AA compounds. Representative polar solvents suitable for formulation with the composition include water, brine, seawater, alcohols (including straight chain or branched aliphatic alcohols such as methanol, ethanol, 2-ethoxyethanol, propanol, isopropanol, butanol, isobutanol, hexanol, 2-ethylhexanol, octanol, or decanol), glycols and glycol ether derivatives (e.g. ethylene glycol, 1,2-propylene glycol, 1,3-propylene glycol, hexylene glycol, ethylene glycol monobutyl ether, ethylene glycol dibutyl ether, or diethylene glycol monomethyl ether), ethers (e.g., tetrahydrofuran), ketones (e.g. methyl ethyl ketone, cyclohexanone, or diisobutyl ketone), amides (e.g., N-methyl-2-pyrrolidinone or N,N-dimethylformamide), and combinations thereof.

Representative nonpolar solvents suitable for formulation with the composition include aliphatic hydrocarbons such as pentane, hexane, cyclohexane, methylcyclohexane, heptane, decane, dodecane, or diesel; aromatic hydrocarbons such as toluene, xylene, heavy aromatic naphtha, fatty acids or derivatives thereof (e.g., amides, esters, or a combination of amide and ester derivatives), and combinations thereof.

The selection of a suitable solvent or combination of solvents provides a stable solution of the compounds during storage and stability and reduced viscosity for the composition when injected against a pressure of 1.3 MPa to 172 MPa. The solvent is present in the composition in the range from about 1 to about 99 wt. %, preferably from about 10 to about 99 wt. %, and more preferably from about 20 to about 99 wt. % of the total composition based on the weight of the total composition.

The compositions can include other means of gas hydrate inhibition, such as thermodynamic hydrate inhibitors and kinetic hydrate inhibitors. If mixtures of gas hydrate inhibitors are used, the mixture can be added to the hydrocarbon and water mixture through a single port or multiple ports. Alternatively, individual gas hydrate inhibitors can be added to separate ports to access the hydrocarbon mixture.

The composition can include other oil field flow assurance components including, but not limited to, a corrosion inhibitor, a scale inhibitor, a paraffin inhibitor, an asphaltene inhibitor, an emulsion breaker, a water clarifier, or a combination thereof.

The particular formulation of the composition depends upon the application of the composition and any additional treatments that will be used in conjunction with the AA compound. For example, if the composition will be injected with a paraffin inhibitor that is typically only formulated in nonpolar solvents, then solvents such as diesel, heavy aromatic naphtha, fatty acid methyl esters, xylene, or toluene, may be used. The composition can also be formulated in a nonpolar solvent to minimize the risk of incompatibility between the AA compound and the other oil field flow assurance components.

Alternatively, if the composition will be injected with a water soluble corrosion inhibitor or scale inhibitor, a polar solvent such as methanol, ethanol, isopropanol, 2-butoxyethanol, ethylene glycol, propylene glycol, or a combination thereof, can be used.

The methods can further comprise treating the fluid with one or more gas hydrate inhibitors in addition to the AA. A thermodynamic hydrate inhibitor and/or kinetic hydrate inhibitor can be formulated with the AA composition or added to the fluid separately. Individual inhibitors can also be added to the fluid at separate ports. The effective amount of thermodynamic hydrate inhibitor and/or kinetic hydrate inhibitor can be empirically determined based on the characteristics of the fluid being treated, for example, using the rocking cell test described herein.

To ensure effective inhibition of agglomeration of gas hydrates, the AA inhibitor composition should be injected prior to formation of gas hydrate agglomerates. The composition can be injected at the wellhead, at subsea, in a riser, or a flow line. Typically, the AA is injected at the wellhead or below the wellhead. The treatment can also be used for pipelines or anywhere in the system where there is a potential for gas hydrate formation.

The composition is introduced into the fluid by any means suitable for ensuring dispersal of the AA through the fluid being treated. Typically the AA is injected using mechanical equipment such as chemical injection pumps, piping tees, injection fittings, and the like. The AA can be injected as prepared or formulated in an additional polar or nonpolar solvent as described herein depending on the application and requirements. The AA compositions can be pumped into the oil/gas pipeline by using an umbilical line. Also, capillary injection systems can be used to deliver the anti-agglomerants. U.S. Pat. No. 7,311,144 provides a description of an apparatus and methods relating to capillary injection, which is herein incorporated by reference.

Referring to the compounds of formula 1A or 1B, the heterocyclic amide compounds wherein Z is —C(O)—NR$_3$—, —C(O)—O—, or —C(O)—S— as described above can be prepared according to Scheme 1:

Scheme 1.

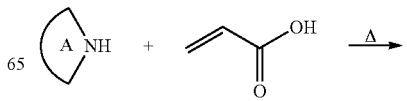

-continued

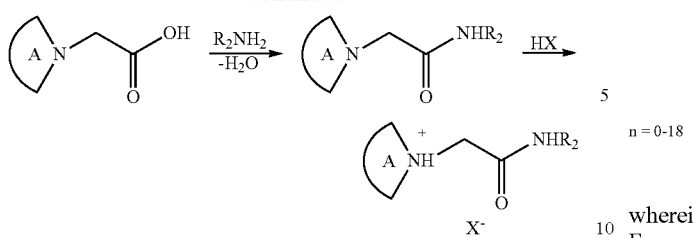

wherein A X, R$_2$ and R$_3$ are as defined for the compound of formula 1A described herein. As is known to a person of ordinary skill in the art, Scheme 1 can be altered to prepare compounds having a longer carbon chain linker between the heterocycle and the carbonyl group.

Further, the heterocyclic amide compounds wherein Z is —NR$_3$—C(O)— can be prepared according to Scheme 2:

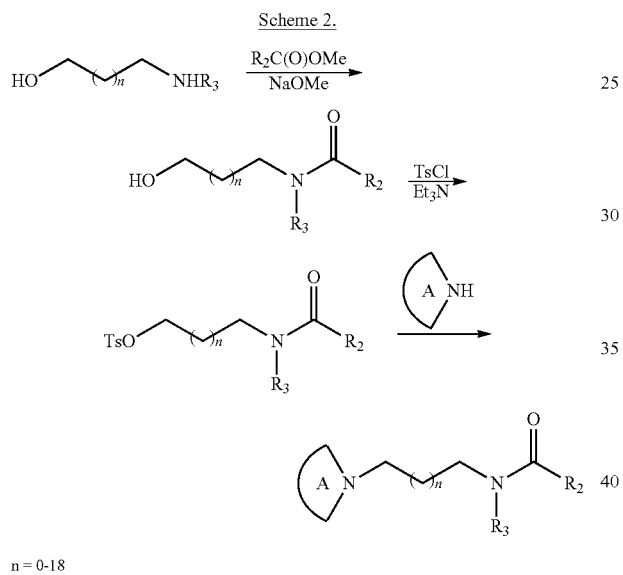

n = 0-18 wherein A, R$_2$, and R$_3$ are as defined for the compound of Formula 1A. The salts of these compounds can be prepared by reacting the product with an acid, HX, wherein X is as defined for the compound of Formula 1B.

The heterocyclic ester compounds wherein Z is —O—C(O)— can be prepared according to Scheme 3:

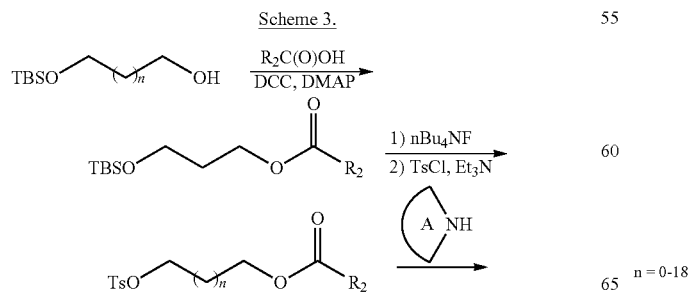

-continued

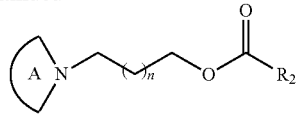

n = 0-18 wherein A and R$_2$ are as defined for the compound of Formula 1A. The salts of these compounds can be prepared by reacting the product with an acid, HX, wherein X is as defined for the compound of Formula 1B.

When Z is —O—C(O)—NR$_3$—, the heterocyclic carbamate compounds can be prepared according to scheme 4:

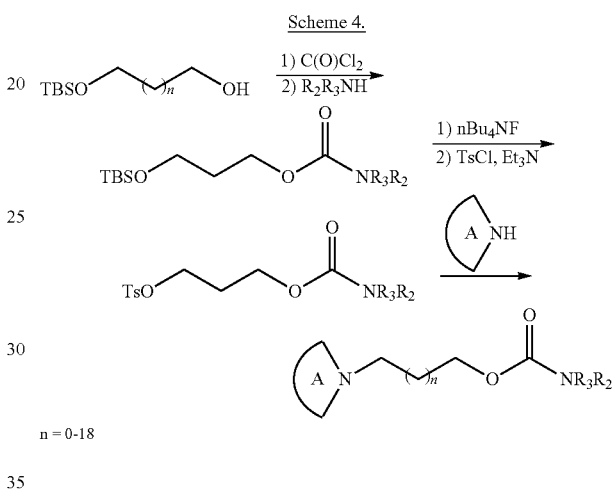

n = 0-18 wherein A, R$_2$, and R$_3$ are as defined for the compound of Formula 1A. The salts of these compounds can be prepared by reacting the product with an acid, HX, wherein X is as defined for the compound of Formula 1B.

When Z is —NR$_3$—C(O)—O—, the heterocyclic carbamate compounds can be prepared according to scheme 5A or 5B:

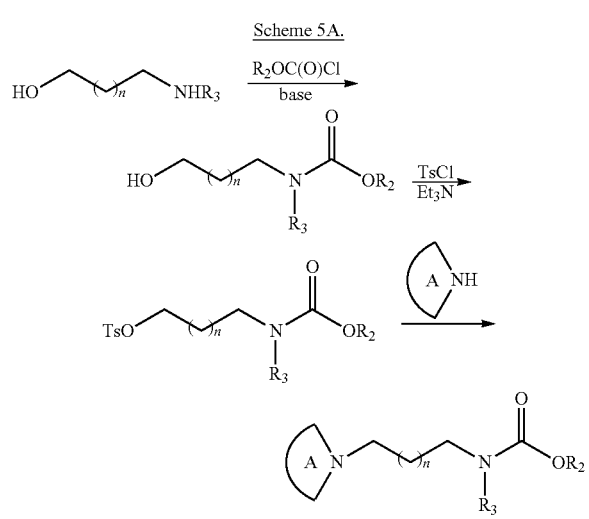

n = 0-18

Scheme 5B.

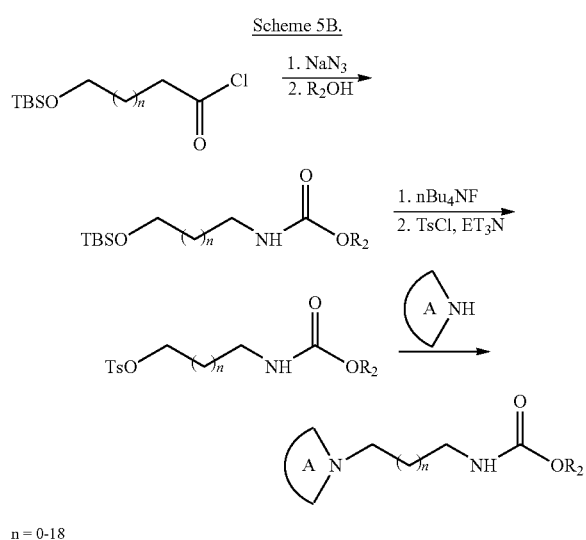

n = 0-18 wherein A, $R_2$, and $R_3$ are as defined for the compound of Formula 1A. The salts of these compounds can be prepared by reacting the product with an acid, HX, wherein X is as defined for the compound of Formula 1B.

When Z is —$NR_3$—C(O)—$NR_3$—, the heterocyclic urea compounds can be prepared according to Scheme 6A or 6B:

Scheme 6A.

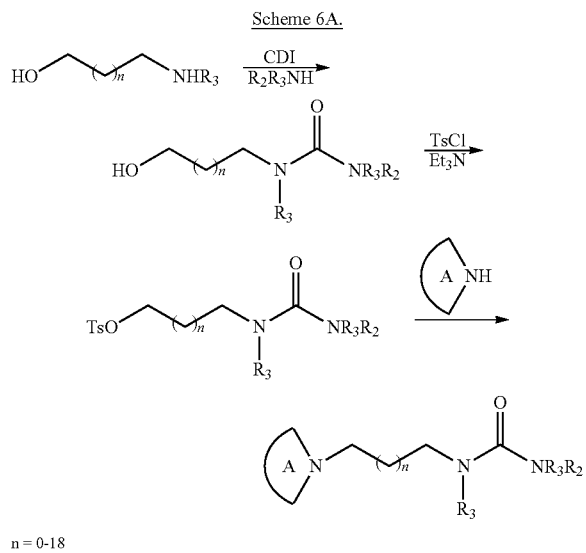

n = 0-18

Scheme 6B.

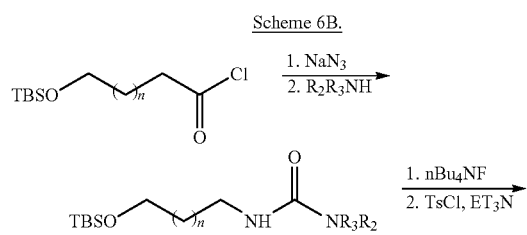

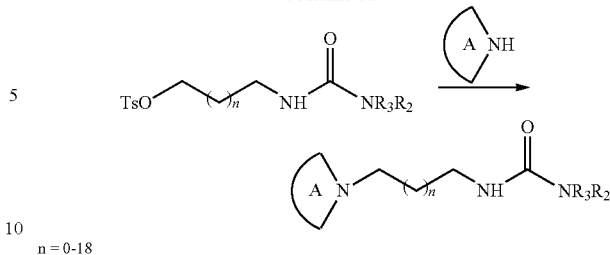

n = 0-18 wherein A, $R_2$, and $R_3$ are as defined for the compound of Formula 1A. The salts of these compounds can be prepared by reacting the product with an acid, HX, wherein X is as defined for the compound of Formula 1B.

The term "nitrogen-containing heterocycle" as used herein alone or as part of another group denote optionally substituted, fully saturated or unsaturated, monocyclic or bicyclic, aromatic or nonaromatic groups having at least one nitrogen atom in at least one ring, and preferably 5 or 6 atoms in each ring. The nitrogen-containing heterocycle can also contain 1 or 2 oxygen atoms or 1 or 2 sulfur atoms in the ring. Exemplary nitrogen-containing heterocycles include pyrrole, pyrroline, pyrrolidine, piperidine, pyrazole, pyrazoline, pyrazolidine, imidazole, imidazoline, imidazolidine, triazole, isoxazole, isoxazoline, isoxazolidine, oxazole, oxazoline, oxazolidine, thiazole, isothiazole, oxadiazole, oxatriazole, dioxazole, oxathiazole, pyridine, pyridazine, pyrimidine, pyrazine, piperazine, triazine, oxazine, oxathiazine, oxazine, isoxazine, oxadiazine, morpholine, azepane, azepine, caprolactam, or quinoline. When substituted, exemplary substituents include one or more of the following groups: substituted or unsubstituted alkyl, substituted or unsubstituted alkenyl, substituted or unsubstituted alkynyl, substituted or unsubstituted aryl, substituted or unsubstituted aralkyl, keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

Unless otherwise indicated, the alkenyl groups described herein are preferably lower alkenyl containing from two to thirty carbon atoms in the principal chain and up to 60 carbon atoms. They may be straight or branched chain or cyclic and include ethenyl, propenyl, isopropenyl, butenyl, isobutenyl, hexenyl, and the like.

Unless otherwise indicated, the alkynyl groups described herein are preferably lower alkynyl containing from two to 30 carbon atoms in the principal chain and up to 60 carbon atoms. They may be straight or branched chain and include ethynyl, propynyl, butynyl, isobutynyl, hexynyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The terms "halogen" or "halo" as used herein alone or as part of another group refer to chlorine, bromine, fluorine, and iodine.

The term "-ene" as used as a suffix as part of another group denotes a bivalent substituent in which a hydrogen atom is removed from each of two terminal carbons of the group, or if the group is cyclic, from each of two different carbon atoms in the ring. For example, alkylene denotes a bivalent alkyl group such as methylene (—CH$_2$—) or ethylene (—CH$_2$CH$_2$—), and arylene denotes a bivalent aryl group such as o-phenylene, m-phenylene, or p-phenylene.

The term "hydrocarbon" as used herein describes a compound or substituent consisting exclusively of the elements carbon and hydrogen.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON(R$_A$)(R$_B$), wherein R$_A$ and R$_B$ are independently hydrogen, alkyl, or aryl), amino(—N(R$_A$)(R$_B$), wherein R$_A$ and R$_B$ are independently hydrogen, alkyl, or aryl), halo (fluoro, chloro, bromo, or iodo), silyl, nitro (—NO$_2$), an ether (—OR$_A$ wherein R$_A$ is alkyl or aryl), an ester (—OC(O)R$_A$ wherein R$_A$ is alkyl or aryl), keto (—C(O)R$_A$ wherein R$_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

"Inhibiting" includes both inhibiting and preventing the formation and agglomeration of hydrate crystals.

Unless otherwise indicated herein, "AA" means anti-agglomerant; "IPA" means isopropanol (isopropyl alcohol); "KHI" means kinetic hydrate inhibitor; "LDHI" means low-dosage hydrate inhibitor; "MeOH" means methanol; "NaCl" means sodium chloride; "PE" means pentaerythritol; and "THI" means thermodynamic hydrate inhibitor.

Having described the invention in detail, it will be apparent that modifications and variations are possible without departing from the scope of the invention defined in the appended claims.

EXAMPLES

The following non-limiting examples are provided to further illustrate the present invention.

Example 1

Synthesis of
1-(3-(Cocoamino)-3-oxopropyl)pyrrolidin-1-ium acrylate

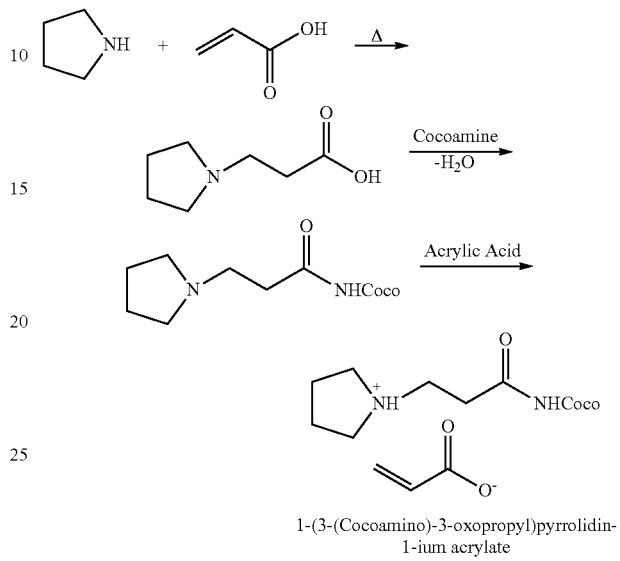

1-(3-(Cocoamino)-3-oxopropyl)pyrrolidin-1-ium acrylate

To a 1000-mL, 3-neck round bottom flask was added 100.0 g (1.40 mol) pyrrolidine and a magnetic stir bar. The flask was fitted with a thermocouple, reflux condenser, and addition funnel containing 101.3 g (1.40 mol) acrylic acid. The acrylic acid was added to the stirring amine slowly. Once the addition was complete, the addition funnel was replaced with a glass stopper and the reaction mixture was heated at 120° C. for 5 hours. Upon cooling to ambient temperature, a bright orange solid was formed. Complete conversion was confirmed by the disappearance of the pyrrolidine starting material by thin layer chromatography (TLC) (1/5 CHCl$_3$/MeOH with 0.5% v/v NH$_4$OH). To the orange solid was added 268.6 g (1.40 mol) cocoamine. An insulated Dean-Stark trap was attached to the apparatus between the flask and reflux condenser for water removal. The reaction mixture was heated at 185° C. for 12 hours at which time TLC analysis (8/1 CHCl$_3$/MeOH with 0.5% v/v NH$_4$OH) confirmed the disappearance of the intermediate carboxylic acid. Upon cooling to ambient temperature an orange liquid was formed. To the resulting amide at ambient temperature was slowly added 101.3 g (1.40 mol) acetic acid and the reaction mixture was stirred at ambient temperature for 2 hours.

Example 2

Anti-Agglomerate Compounds 1-11

1

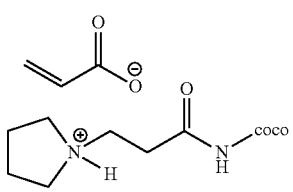

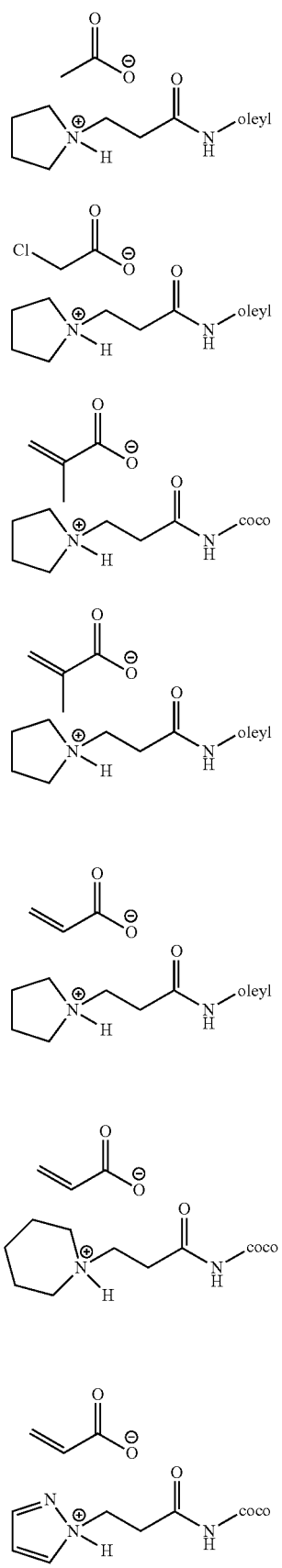

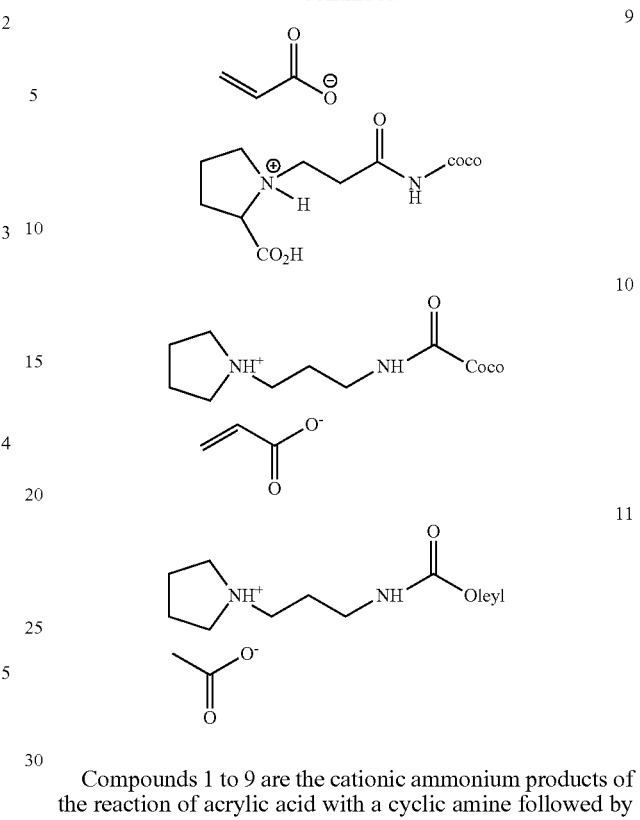

Compounds 1 to 9 are the cationic ammonium products of the reaction of acrylic acid with a cyclic amine followed by amide formation and acid salting of the amine. The adducts are a variety of derivatives with different counter-ions, amide tails, and cyclic amines. All show performance as AAs.

Compounds 1 to 10 were dissolved to 40% w/w in the solvents listed below for the anti-agglomeration test.

| Compound | Solvent |
|---|---|
| 1 | MeOH |
| 2 | MeOH |
| 3 | IPA |
| 4 | IPA |
| 5 | IPA/MeOH |
| 6 | IPA/MeOH |
| 7 | IPA/MeOH |
| 8 | IPA/MEG |
| 9 | IPA/MEG |
| 10 | IPA/MEG |

Example 3

Rocking Cell Test

A Sapphire Rocking Cell RCS is commercially available from PSL Systemtechnik in Germany. The Sapphire Rocking Cell is a laboratory instrument used to test the performance of low dosage hydrate inhibitors. The compounds were evaluated based on their ability to effectively minimize the size of gas hydrate agglomerate particles and disperse those particles into the hydrocarbon phase. Chemical performance was evaluated by determining the maximum treatable water cut (water to oil ratio) and the minimum chemical dosage to register a pass in the rocking cell test.

A rocking cell has two parts, a manifold and a cell body. The manifold is made up of stainless steel fittings that are welded together. It has three stems. An inlet stem is used to charge gas into the cell. An outlet stem is used to release the gas out of the cell. The third stem connects to a transducer, which measures the pressure inside of the cell. The cell body has three layers. The outer layer is a polycarbonate tube, which has a thickness of 0.7 cm. The middle layer is made of stainless steel metal and is connected to the manifold. The inner layer is a high-pressure sapphire tube, which has an outer diameter of 2.8 cm, inner diameter of 1.85 cm, and length of 5 cm. This sapphire tube can handle up to 3000 psi. A stainless steel ball which has a diameter of 1.6 cm is located inside the sapphire tube to induce turbulence and mix fluids during the rocking process.

Test fluids usually contain three components. For the anti-agglomerate test, 7.2 mL of warm crude oil was first injected into the cell. Next, a solution of 30,000 total dissolved solids (TDS) (7% by weight) of NaCl synthetic brine was injected into the cell to make a 40% water cut mixture. The anti-agglomerate test compound was the final component injected into the cell. The dosage of the test compound was based on the volume of aqueous phase. The initial temperature was set to 21° C. Observations were made every two to three hours, before the rocking was stopped, and also immediately after the restart.

Each cell was charged with Green Canyon gas and pressurized up to 2500 psi. All cells rocked for at least 1.5 to 2 hours until fluid was saturated and pressure stabilized. The rocking was ceased and the tank temperature was reduced to the set point of 4° C. over approximately 8 hours. The cells were then reboosted to a pressure of 2500 psi and remained static for 24 hours. Rocking was restarted for 2 hours with frequent observations to rank each cell with a ranked set of pass/fail criterion. Pressure and tank temperature data was recorded during this time.

TABLE 1

Rocking cell experiment results for anti-agglomerates

| AA | Treatment (vol % based on water) | Result |
|---|---|---|
| Comparative Example A | 4.0% | Fail |
| 1 | 4.0% | Pass |
| 2 | 3.0% | Pass |
| 3 | 3.0% | Pass |
| 4 | 4.0% | Pass |
| 5 | 4.0% | Pass |
| 6 | 4.0% | Pass |
| 7 | 4.0% | Borderline |
| 8 | 4.0% | Borderline |
| 9 | 4.0% | Borderline |

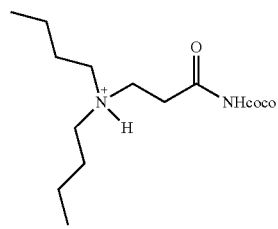

Comparative Example A

1 SC Condition: For this test, 14,000 TDS (NaCl) synthetic brine was added to the sapphire cell, followed by the addition of chemical and then 1SC oil. Test was set at 40° C. as initial condition. Each cell was charged with Green Canyon gas and pressurized up to 3700 psi pressure. All cells were rocked for at least 30 minutes to saturate the fluids and stabilize the pressure. The rocking was ceased and the tank temperature was reduced to the set point of 4° C. over a period of 8 hours and then allowed to remain static for 24 hours. Rocking was restarted for 2 hours with frequent observations to rank each cell with a ranked set of pass/fail criterion. Pressure and tank temperature data is recorded during this time.

2SO Condition: For this test, 1,000 TDS (NaCl) synthetic brine was added to the sapphire cell, followed by the addition of chemical and then 2SO oil. Test was set at 37° C. as initial condition. Each cell was charged with Green Canyon gas and pressurized up to 4300 psi pressure. All cells were rocked for at least 30 minutes to saturate the fluids and stabilize the pressure. The rocking was ceased and the tank temperature was reduced to the set point of 4° C. over a period of 8 hours and then allowed to remain static for 24 hours. Rocking was restarted for 2 hours with frequent observations to rank each cell with a ranked set of pass/fail criterion. Pressure and tank temperature data is recorded during this time.

| AA | Oil sample | Treatment (vol % based on water) | Result |
|---|---|---|---|
| Comparative Example A | | 2.0% | Fail |
| 2 | 1SC | 2.0% | Pass |
| 10 | 1SC | 2.0% | Borderline Pass |
| 2 | 2SO | 5.0% | Pass |
| 10 | 2SO | 2.0% | Fail |
| 11 | 2SO | 2.0% | Pass |

The pass/fail criteria are based on the ability of the ball in the rocking cell to move within the sapphire tube. For example, the anti-agglomerant passes the rocking cell test if at the time of the ranking, the ball moves freely when the cell is rocked indicating that few agglomerates have formed. In contrast, the anti-agglomerant fails if the ball's movement is obstructed or completely stopped by the formation of gas hydrate agglomerates. The anti-agglomerate's performance is borderline when there are observable gas hydrate agglomerates and at least some of the agglomerates are stuck to the walls of the sapphire tube; when these agglomerates are present and the movement of the ball is not restricted, the anti-agglomerant ranking is a borderline pass. Green Canyon gas is a standard gas composition of several reservoirs in the Gulf of Mexico and has the composition described in the following table.

| Nitrogen | 0.39% |
|---|---|
| Methane | 87.26% |
| Ethane | 7.57% |
| Propane | 3.10% |
| iso-Butane | 0.49% |
| n-Butane | 0.79% |
| iso-Pentane | 0.20% |
| n-Pentane | 0.20% |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing[s] shall be interpreted as illustrative and not in a limiting sense.

What is claimed is:

1. A method for inhibiting gas hydrate agglomeration in a fluid comprising a hydrocarbon and water, the method comprising adding to the fluid an effective amount of a compound of formula 2A, 3A, 4A, 5A, or 7A to inhibit gas hydrate agglomeration in the fluid, wherein the compound of Formula 2A, 3A, 4A, 5A, or 7A corresponds to the following structures:

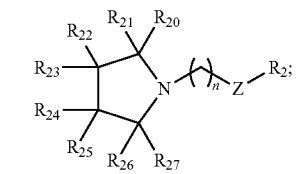
Formula 2A

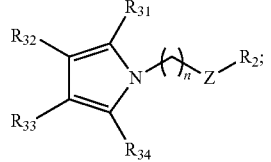
Formula 3A

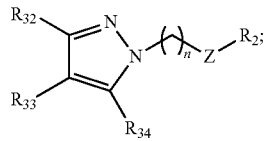
Formula 4A

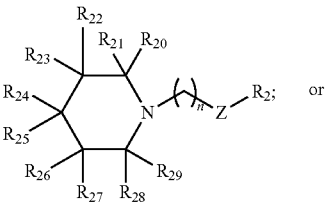
Formula 5A

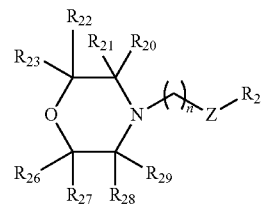
Formula 7A wherein $R_{20}$, $R_{21}$, $R_{22}$, $R_{23}$, $R_{24}$, $R_{25}$, $R_{26}$, $R_{27}$, $R_{28}$, and $R_{29}$ are each independently hydrogen, alkyl, alkoxy, aminoalkyl, carboxyl, carboxyalkyl, alkenyl, alkenoxy; carboxyalkenyl, aryl, aryloxy, or carboxyaryl;

$R_{31}$, $R_{32}$, $R_{33}$, and $R_{34}$ are each independently hydrogen, alkyl, alkoxy, aminoalkyl, carboxyl, carboxyalkyl, alkenyl, alkenoxy; carboxyalkenyl, aryl, aryloxy, or carboxyaryl;

$R_2$ is optionally substituted alkyl, alkenyl, or alkynyl;

Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, or —$NR_3$—C(O)—$NR_3$—;

$R_3$ is hydrogen or optionally substituted alkyl, alkenyl, alkynyl, or aryl; and n is an integer from 0 to 25.

2. The method of claim 1 wherein $R_2$ is $C_{10}$-$C_{24}$ alkyl or alkenyl;

Z is —$NR_3$—C(O)— or —C(O)—$NR_3$—, n is an integer from 0 to 12.

3. The method of claim 1 wherein Z is —C(O)—$NR_3$— and $R_3$ is hydrogen.

4. The method of claim 3 wherein $R_2$ is $C_{10}$-$C_{20}$ alkyl or alkenyl, and n is 2 or 3.

5. The method of claim 1 wherein the compound has the structure of Formula 3A

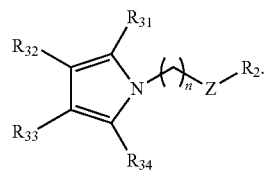
Formula 3A

6. The method of claim 5 wherein $R_{31}$, $R_{32}$, $R_{33}$, and $R_{34}$ are hydrogen, Z is —$NR_3$—C(O)— or —C(O)—$NR_3$—, $R_3$ is hydrogen, $R_2$ is $C_{10}$-$C_{20}$ alkyl or alkenyl, and n is 2 or 3.

7. The method of claim 6 wherein Z is —C(O)—$NR_3$—, and n is 2.

8. The method of claim 6 wherein Z is —$NR_3$—C(O)—, and n is 3.

9. The method of claim 1 wherein the compound has the structure of Formula 4A

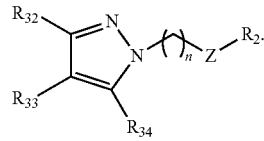
Formula 4A

10. The method of claim 9 wherein $R_{32}$, $R_{33}$, and $R_{34}$ are hydrogen, Z is —$NR_3$—C(O)— or —C(O)—$NR_3$—, $R_3$ is hydrogen, $R_2$ is $C_{10}$-$C_{20}$ alkyl or alkenyl, and n is 2 or 3.

11. The method of claim 9 wherein Z is —C(O)—$NR_3$—, and n is 2.

12. The method of claim 9 wherein Z is —$NR_3$—C(O)—, and n is 3.

13. A method for inhibiting gas hydrate agglomeration in a fluid comprising a hydrocarbon and water, the method comprising adding to the fluid an effective amount of a compound of formula 2A to inhibit gas hydrate agglomeration in the fluid, the compound having the structure

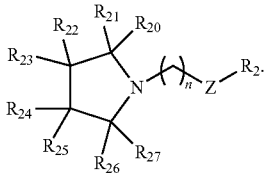

Formula 2A wherein $R_{20}$, $R_{21}$, $R_{22}$, $R_{23}$, $R_{24}$, $R_{25}$, $R_{26}$, $R_{27}$, $R_{28}$, and $R_{29}$ are each independently hydrogen, alkyl, alkoxy, aminoalkyl, carboxyl, carboxyalkyl, alkenyl, alkenoxy; carboxyalkenyl, aryl, aryloxy, or carboxyaryl;

$R_{31}$, $R_{32}$, $R_{33}$, and $R_{34}$ are each independently hydrogen, alkyl, alkoxy, aminoalkyl, carboxyl, carboxyalkyl, alkenyl, alkenoxy; carboxyalkenyl, aryl, aryloxy, or carboxyaryl;

$R_2$ is optionally substituted alkyl, alkenyl, or alkynyl;

Z is —$NR_3$—C(O)—, —C(O)—$NR_3$—, —O—C(O)—, —C(O)—O—, —S—C(O)—, —C(O)—S—, —O—C(O)—$NR_3$—, —$NR_3$—C(O)—O—, or —$NR_3$—C(O)—$NR_3$—;

$R_3$ is hydrogen or optionally substituted alkyl, alkenyl, alkynyl, or aryl; and n is an integer from 0 to 25.

14. The method of claim 13 wherein $R_{20}$, $R_{21}$, $R_{22}$, $R_{23}$, $R_{24}$, $R_{25}$, $R_{26}$, and $R_{27}$ are hydrogen, Z is —$NR_3$—C(O)—or —C(O)—$NR_3$—, $R_2$ is $C_{10}$-$C_{20}$ alkyl or alkenyl, and n is 2 or 3.

15. The method of claim 14 wherein Z is —C(O)—$NR_3$—, $R_3$ is hydrogen, and n is 2.

16. The method of claim 14 wherein Z is —$NR_3$—C(O)—, $R_3$ is hydrogen, and n is 3.

17. The method of claim 14 wherein $R_3$ is hydrogen.

* * * * *

UNITED STATES PATENT AND TRADEMARK OFFICE
CERTIFICATE OF CORRECTION

PATENT NO. : 10,281,086 B2
APPLICATION NO. : 15/231424
DATED : May 7, 2019
INVENTOR(S) : Peter A. Webber et al.

Page 1 of 1

It is certified that error appears in the above-identified patent and that said Letters Patent is hereby corrected as shown below:

In the Claims

On Column 24, Claim 1, Line 2:
"-C(O) -S ," should read "-C(O)-S"

On Column 24, Claim 1, Lines 2-3:
"-O-C (O)- NR3-," should read "-O-C(O)-NR3-"

On Column 24, Claim 2, Line 10:
"-C(O) -or" should read "-C(O)- or"

On Column 24, Claim 3, Lines 14-15:
"-C(O)-NR3 -and" should read "-C(O)-NR3- and"

On Column 24, Claim 10, Line 55:
"-NR3-C(O)-or" should read "-NR3-C(O)- or"

On Column 25, Claim 13, Lines 1-10:

" 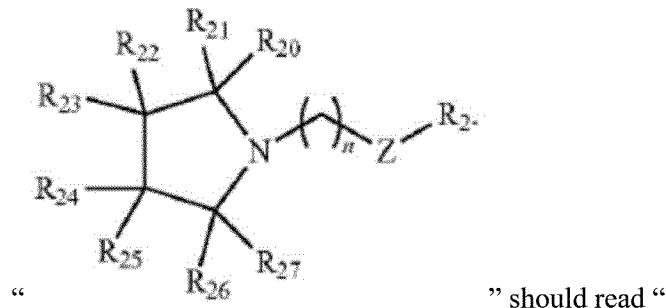 " should read " 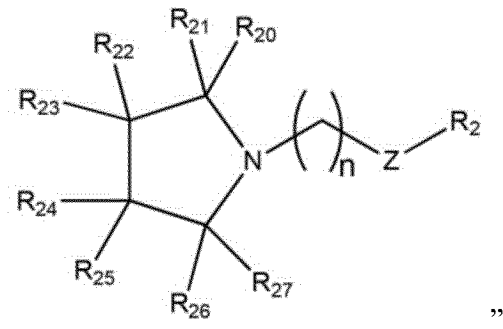 "

On Column 26, Claim 14, Line 10:
"-NR$_3$-C(O)-or" should read "-NR$_3$-C(O)- or"

Signed and Sealed this
Fifteenth Day of December, 2020

Andrei Iancu
*Director of the United States Patent and Trademark Office*